Sept. 23, 1958        B. H. McCURDY        2,852,927

COINCIDENTAL DOOR LOCKING SYSTEM FOR VEHICLES

Original Filed Nov. 12, 1952        3 Sheets-Sheet 1

INVENTOR.

*Belding H. McCurdy.*

BY

*Harness, Dickey & Pierce*

ATTORNEYS.

Sept. 23, 1958 B. H. McCURDY 2,852,927
COINCIDENTAL DOOR LOCKING SYSTEM FOR VEHICLES
Original Filed Nov. 12, 1952 3 Sheets-Sheet 2

INVENTOR.
Belding H. McCurdy.
BY
Harness, Dickey & Pierce
ATTORNEYS.

Sept. 23, 1958 B. H. McCURDY 2,852,927
COINCIDENTAL DOOR LOCKING SYSTEM FOR VEHICLES
Original Filed Nov. 12, 1952 3 Sheets-Sheet 3
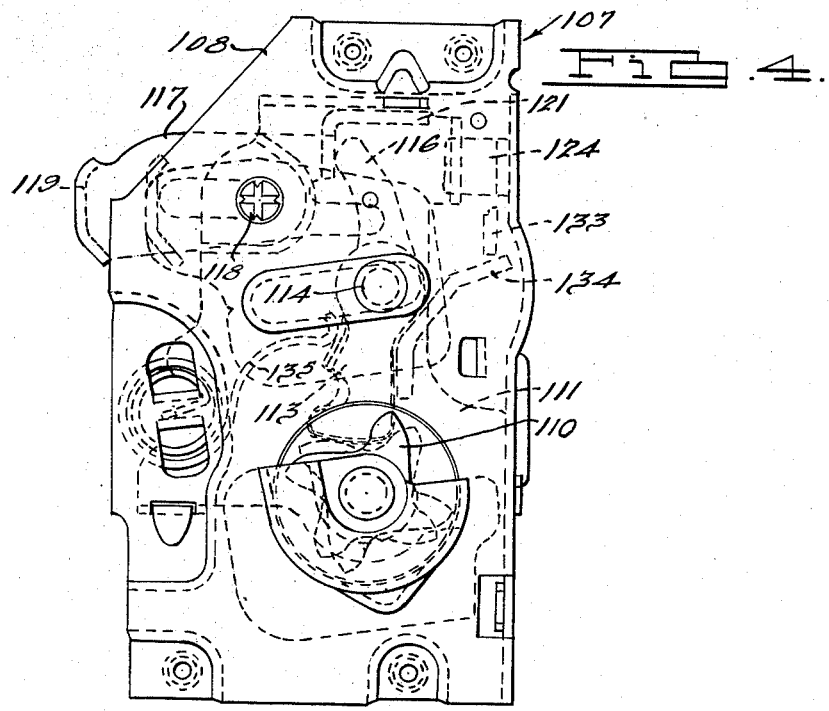
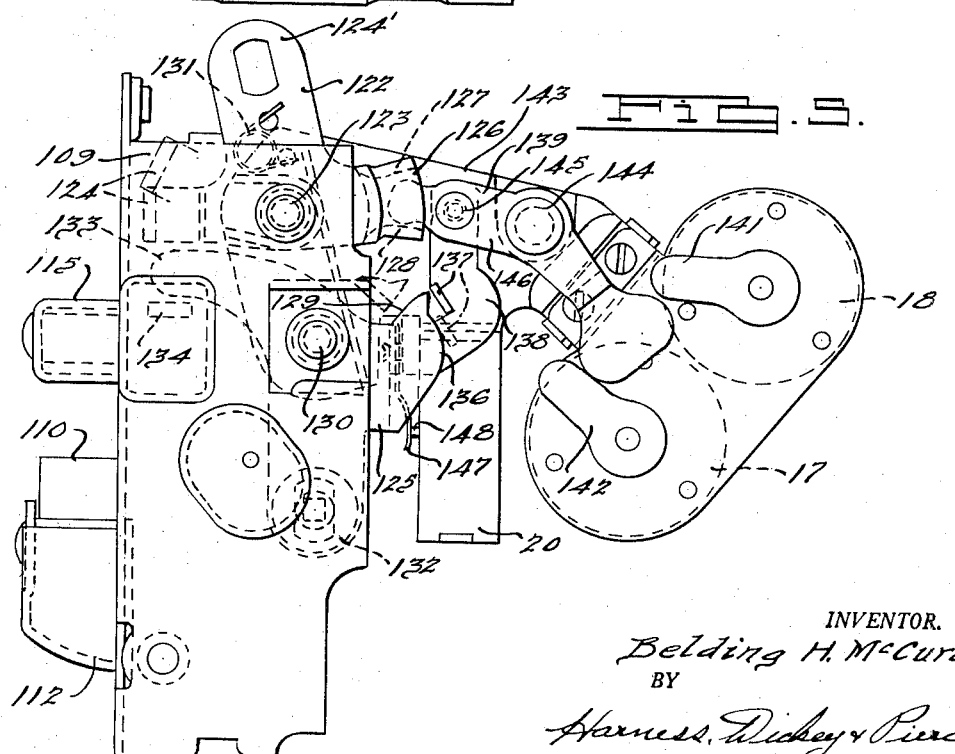
INVENTOR.
Belding H. McCurdy
BY
Harness, Dickey & Pierce
ATTORNEYS.

United States Patent Office 2,852,927
Patented Sept. 23, 1958

2,852,927

COINCIDENTAL DOOR LOCKING SYSTEM FOR VEHICLES

Belding H. McCurdy, Jackson, Mich., assignor to Hancock Industries, Inc., a corporation of Michigan Continuation of application Serial No. 320,069, November 12, 1952. This application October 16, 1956, Serial No. 616,169

32 Claims. (Cl. 70—264)

This invention relates to automotive vehicles, and more particularly to coincidental locking systems in which all the doors of a vehicle may be simultaneously locked or unlocked by a single manipulation. This application is a continuation of application Serial No. 320,069 filed November 12, 1952, now abandoned.

It is a general object of the invention to provide an improved coincidental locking system of simplified construction for vehicle doors in which all the doors of the vehicle may be simultaneously locked by a simple operation on one of the doors when a passenger leaves the vehicle, and in which the unlocking of any door either from the outside or inside will simultaneously unlock all the other doors.

It is another object of the invention to provide an improved coincidental locking system as above described, in which means are provided for preventing accidental locking of the car when the key is left in the ignition switch, but in which all the doors may nevertheless be simultaneously locked from the inside when all the doors are closed, even if the ignition key is inserted.

It is a further object to provide an improved coincidental locking system of the above nature in which selective means are provided for disenabling the rear door unlocking means so that these doors may not be unlatched from the inside, while the unlocking means for the front doors are still enabled, so that for example, children in the back seat of a vehicle may not accidentally open the rear doors.

It is another object of the invention to provide an improved coincidental locking system of the above nature in which conventional types of door locks may be utilized with little structural variation, and in which the locking and unlocking portions of the locks operate in the same manner as with manual operation. In this connection, it is an object to provide a locking system in which the locks each have locking and unlocking solenoids for actuating the locking members, these solenoids being only momentarily actuated so that there is no appreciable drain on the battery.

It is another object to provide a locking system as above described in which failure of the electrical power supply will not prevent locking and unlocking of the doors, which may still be operated manually in the conventional manner.

It is a further object to provide an improved coincidental locking system of the above nature in which the unlocking solenoids will be energized only upon the initial unlocking operation, so that repeated openings of the doors when they are already unlocked will not reenergize the unlocking solenoids.

Other objects, features, and advantages of the present invention will become apparent from the subsequent description, taken in conjunction with the accompanying drawings.

In the drawings:

Figure 4 is a front elevational view of a preferred rear door lock for use with the system; and Figure 5 is a side elevational view of the rear lock.

The invention comprises in general a pair of front door locks and a pair of rear door locks for the vehicle which may be of conventional construction as regards their latching functions but which are each provided with a locking and an unlocking solenoid. The locking solenoid of each lock is capable when energized of moving the locking means into locking position, whereas the unlocking solenoid when energized moves the locking means into unlocking position, so that the door may be unlatched. Each front door is provided with a manually operated locking switch mounted, for example, on the interior panel, and this locking switch when actuated serves to energize all the locking solenoids simultaneously, thus locking all the doors. This operation may be performed when the front door is open, and subsequent closing of this door will not affect the locked condition of the other doors or of the door being closed. All the locks are further provided with unlocking switches preferably mounted on the lock structure, and each of these switches serves when actuated to energize all the unlocking solenoids, thereby rendering all the doors unlocked. The front door unlocking switches may be actuated either manually from the inside or key actuated from the outside, while the rear door unlocking switches are actuated from the inside. The inside operating means for the front and rear door unlocking switches are suitably controlled by unlatching movement of the inside handles.

Means are provided for insuring that the car is not inadvertently locked with the key still in the ignition switch, and this means preferably takes the form of a switch in series with the locking switches which is open whenever the key is inserted in the ignition switch. However, if the front doors are both closed, door jamb switches bypass the ignition safety switch, so that if a passenger is seated in the vehicle and closes the doors, he may operate a locking switch to lock all the doors even if his ignition key is inserted.

Means are also provided for selectively disenabling the rear door unlocking switches, this means being controllable by an occupant of the front seat. Thus, children in the back seat may be prevented from accidentally opening the rear doors, while the front doors may be still unlatched. The locks are further provided with means for preventing the re-energization of the unlocking solenoids when the locking members are already in unlocked condition, so that repeated openings of the doors will not waste electric power. All the locks are also capable of being mechanically moved into locking or unlocking condition independently of the electrical system, so that failure of the power supply will not prevent normal use of the locks.

Coincidental locking system

Figure 1:
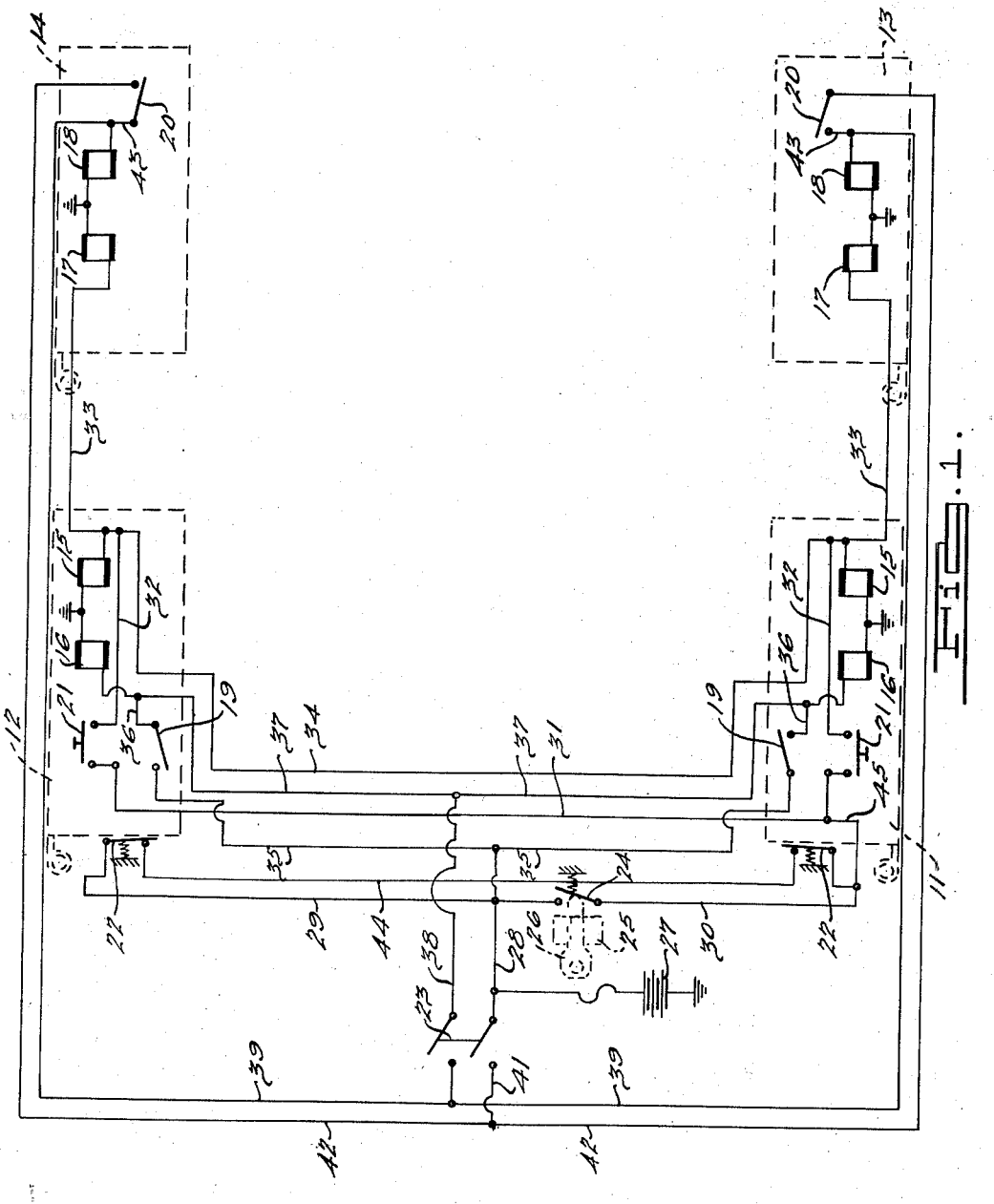
Figure 1 is a schematic diagram of the electrical circuit for the improved coincidental door locking system of this invention.

Referring more particularly to Figure 1 of the drawings, 11, 12, 13 and 14 indicate schematically the left front, right front, left rear and right rear doors respectively of an automotive vehicle. The door locks which are mounted in each of these doors are not shown in Figure 1, but each door lock is provided with a locking solenoid and an unlocking solenoid shown schematically in this figure. Since the left and right front doors are symmetrical and the left and right rear doors are symmetrical, the locking solenoids for the front doors may be indicated by the same reference numeral 15 and the unlocking solenoids referred to as 16. The rear doors have locking solenoids 17 and unlocking solenoids 18 forming part of their respective door locks.

Also mounted as part of each front door lock is an unlocking switch 19, and the rear door locks are provided with unlocking switches 20. Mounted on the interior of each front door is a locking switch 21 which is preferably a simple push button switch. Although the actual location of this switch is unimportant, it may for example be mounted on the interior panel of the door or on the inside garnish molding. Each front door is also provided with a door jamb switch 22 which is closed when the door is closed. Like the locking switch, the actual location of the door jamb switch is not pertinent to the invention, and it may be secured to the door jamb or to the door itself so as to be open whenever the door is not in closed position. A double pole single throw switch 23, henceforth referred to as a baby switch, is preferably mounted on the dashboard of the vehicle or in a similar place where it can be operated by a front seat occupant. An ignition safety switch 24 is also provided as part of the ignition switch 25, switch 24 being so constructed that it is held open whenever the ignition key 26 is inserted in the ignition switch, whether off or on, and closed whenever the key is removed.

Although various wiring arrangements may be used to accomplish the results achieved by the invention, Figure 1 illustrates a preferred wiring diagram of the coincidental locking system. As shown, the positive side of battery 27 is connected through a fuse or circuit breaker to a lead 28 connected to one pole of baby switch 23. The battery is also connected through parallel leads 29 and 30 to one contact of each door jamb switch 22. Lead 30 has interposed therein the ignition safety switch 24, and is connected directly to the left front door locking switch 21 and by a lead 31 to the right front door locking switch 21. The other side of each switch 21 is connected to the front door locking solenoids 15 by leads 32, and to the rear door locking solenoids 17 by leads 33 extending from leads 32. A lead 34 interconnects leads 32 so that actuation of either locking switch 21 will energize both locking solenoids 15 and both locking solenoids 17. The other sides of the locking solenoids are all connected to the ground side of battery 27. Lead 28 from the positive side of the battery also is connected directly to one side of each front door unlocking switch 19 by means of leads 35, and the other side of each unlocking switch 19 is connected by a lead 36 to one side of its corresponding unlocking solenoid 16, the other sides of these solenoids leading to ground. A lead 37 interconnects leads 36 so that the closing of either unlocking switch 19 acts to energize both unlocking solenoids 16.

A lead 38 connects lead 37 to parallel leads 39 which are connected to rear door unlocking solenoids 18. It is therefore seen that actuation of either front door unlocking switch 19 will energize rear door unlocking solenoids 18 as well as front door unlocking solenoids 16. One pole of baby switch 23 is interposed in lead 38 so that when the baby switch is open the rear door unlocking solenoids 18 cannot be energized by actuation of the front door unlocking switches.

The rear door unlocking switches 20 are connected on one side of the positive terminal of the battery by means of a lead 41 from the battery connected to parallel leads 42 which lead to the rear door unlocking switches. The other sides of the rear door unlocking switches are connected by leads 43 to the rear door unlocking solenoids. Leads 38 and 39, which were described above as serving to energize the rear door unlocking solenoids when the front door unlocking switches are actuated, also serve to energize the front door unlocking solenoids when the rear door unlocking switches are actuated, this circuit being completed through leads 37.

The other pole of baby switch 23 is interposed in lead 41, so that when the baby switch is open rear door unlocking switches 20 are disenabled and cannot serve to energize any of the unlocking solenoids. In other words, with the baby switch closed, actuation of any unlocking switch 19 or 20 will unlock all the doors. With the baby switch open, front door unlocking switches 19 will unlock only the front doors and rear door unlocking switches 20 will be inoperative.

As stated previously, ignition safety switch 24 is interposed in lead 30 from the positive side of the battery, so that when the ignition key is in the switch lead 30 will be opened, thereby disenabling locking switches 21. In order to bypass the ignition safety switch 24, the two door jamb switches 22 are connected by a lead 44, so that current can flow through lead 29 to the right hand door jamb switch, and if the latter is closed through lead 44 to the left hand door jamb switch. If this switch is also closed current can then be carried to the locking switches 21 through leads 45 and 31. It should be noted that both doors must be closed in order for the door jamb switches 22 to act as a bypass for the ignition safety switch. It should also be observed that the operation of the door jamb switches and ignition safety switch in no way interferes with the operation of the baby switch, since the latter only affects enabling of the rear door unlocking switches 20 and unlocking solenoids 18.

Operation of system

In describing the operation of the coincidental locking system, it is not believed necessary to understand the details of operation of the door locks themselves, other than the relationship of the various switches and solenoids to the door lock structures. For purposes of understanding the operation of the system, it should therefore be kept in mind that:

(1) The locking and unlocking solenoids are mechanically connected to the locking members of their resepctive locks; that is, energization of each locking solenoid serves to move its corresponding locking member into locking position, and energization of the unlocking solenoids moves the locking members into unlocking position.

(2) The front door unlocking switches 19, rear door unlocking switches 20, locking switches 21 and door jamb switches 22 are all of the normally open type. The baby switch 23 is selectively held in open or closed position, and the ignition safety switch 24 is normally closed and is opened by insertion of the ignition key, whether the ignition is off or on.

(3) The front door unlocking switches 19 are actuatable either by rotation of the key from the outside or by manipulation from the inside. As described later in detail, the inside manipulation may be co-ordinated with manipulation of the inside door handle to unlatch the door.

(4) The rear door unlocking switches 20 are actuated only by manipulation from the inside, and like the front door unlocking switches are shown as preferably actuated by movement of the inside door handle.

(5) The locking switches 21 are accessible from the inside of the car and are actuated manually. The baby switch 23 is accessible only to an occupant of the front seat.

(6) The door jamb switches 22 are closed only by full closing of the front doors.

Beginning with a condition in which there is an occupant in the front seat, the motor is running and all the doors are closed and locked, if the occupant wishes to stop the car, leave the vehicle and lock it, his first step is to remove the ignition key from the ignition lock. This action closes ignition safety switch 24. The occupant then operates one of the inside front door handles, say, the left front, to unlatch the left front door 11. Movement of this inside handle momentarily closes left front unlocking switch 19. A circuit will be completed from the battery through leads 28 and 35, through left front unlocking switch 19 and lead 36 to left front unlocking solenoid 16. It should be here stated that the locks shown in the illustrated embodiment are of the type in which only the outside handle is locked, so that inside handle movement is permitted at all times. It will be understood however that the principles of the coincidental locking system could be applied to front door locks of other types.

Actuation of left front unlocking switch 19 will not only energize left front unlocking solenoid 16 but will also energize right front unlocking solenoid 16 through lead 37. Assuming that baby switch 23 is closed, rear unlocking solenoids 18 will also be energized through lead 38 and parallel leads 39. Thus, the left front door will be unlatched and all the other doors will be unlocked, although still latched. It should be noted that unlocking solenoids 16 and 18 are only actuated momentarily, since release of the inside door handle will allow switch 19 to assume its normally open position. However, the locks will remain in their unlocking condition due to their conventional overcenter action, described later in detail.

After opening the left front door and as he leaves the vehicle, the occupant momentarily actuates left locking switch 21. A circuit will then be completed from the battery through lead 28, ignition safety switch 24, lead 30, lead 45, left locking switch 21 and left lead 32 to left front locking solenoid 15, momentarily energizing this solenoid to move the left front door locking member into locking position. A circuit will also be completed from left lead 32 through lead 34 to the right front locking solenoid, and through leads 33 to the right rear and left rear locking solenoids 17. Thus, all the door locks will be placed in locked condition.

The operator then closes the left front door. It should be noted at this point that, as described later in detail, the front doors are not provided with the kick-off mechanism conventional in some lock constructions which automatically places a door in unlocked condition when it is slammed. In the present instance, the absence of this kick-off mechanism means that the left front door will remain in its locked condition, even though it was placed in this condition before being closed.

It is obvious from the circuit diagram that a person leaving through the right front door 12 can perform the same operations of unlocking and locking all doors as described above with respect to the left front door.

Assuming that the operator has neglected to remove the ignition key from the ignition lock, ignition safety switch 24 will remain open whether the ignition is off or on. This will not affect the unlocking function of the system, as will be evident from an examination of Figure 1. As seen in this figure, current for the unlocking solenoids is carried from the battery through lead 38 and parallel leads 39, but does not pass through lead 30 in which ignition safety switch 24 is interposed. However, lead 30 does supply the current for locking switches 21, so that there can be no actuation of the locking solenoids 15 and 18 if switch 24 is open. It will thus be seen that the steps described above will, if the ignition key is left in the switch, merely result in all the car doors remaining unlocked. The operator upon realizing his mistake may then re-enter the car, remove the ignition key and repeat the above described operations.

Assuming now that the operator has returned to the vehicle and wishes to unlock it and enter, he will insert the car key in one of the front door locks, say the left front door. Turning the key will result in momentarily closing the left front unlocking switch 19. This will close circuits identical with those described with respect to manipulation of the left front inside door handle and will result in unlocking of all the doors. As pointed out below in detail, key rotation will also mechanically unlock the door to which the key is applied, so that in the event of battery failure the operator is assured of being able to re-enter the vehicle.

Assuming all the doors are unlocked, occupants may then enter any of the doors simultaneously, and it is not necessary for the holder of the key to get into the vehicle and open each door individually. When the passengers have all entered the vehicle and have closed their respective doors, the doors may be all simultaneously locked by pressing either locking switch 21. If the key is not yet in the ignition switch, this locking action may take place before all the doors are closed, the circuits being energized in identical fashion with those described above with relation to the locking switch. If the ignition key is in the switch, the front doors must be closed in order that the locking switches be effective. The circuit from the battery in this case would by-pass ignition safety switch 24, and include lead 29, right door jamb switch 22, lead 44 and left door jamb switch 22.

If an occupant of the rear seat wishes to leave the vehicle, assuming that all the vehicle doors are locked, the rear seat occupant operates an inside door handle which, as will be later seen, upon its initial movement momentarily closes a rear unlocking switch 20. Assuming that the baby switch is closed, this movement closes a circuit from the battery through the baby switch 23, lead 41, one of the leads 42, the closed rear unlocking switch 20, lead 43, and corresponding unlocking solenoid 18. A circuit is also closed from the closed unlocking switch 20 through leads 39 to the other unlocking solenoid 18 and through one lead 39, baby switch 23, lead 38 and parallel leads 37 to front door unlocking solenoids 16. It is therefore seen that a rear seat occupant alighting from the vehicle will unlock all the doors but that these doors except his own will still remain closed. The rear seat passenger after alighting from the vehicle closes his rear door, which does not affect the status of the system. In order to relock all the doors, an occupant of the front seat actuates one of the locking switches 21. This may be done before or after the rear door is closed, since no kick-off feature is present in the rear door locks.

If it is desired that occupants of the rear seat such as children be prevented from unlatching the rear doors from the inside, then baby switch 23 is opened and one of the locking switches 21 is actuated. After this is done, it will be seen that none of the unlocking switches 19 or 20 are capable of energizing the rear door unlocking solenoids 18. For example, if the child pulls on one of the rear inside door handles, the subsequent closing of an unlocking switch 20 will have not effect on any of the doors, since the connection between leads 28 and 41 is broken. Likewise, actuation of either front door unlocking switch 19 will serve to unlock the front doors through the normal connections described above, but will have no effect on the rear doors because the connection between the lead 38 and parallel leads 39 is broken.

It will be noted that when the baby switch is in operative or open position the front seat passengers are not hampered in any way in their normal use of the locking system for the front doors. It is also important to observe that the sequence of operations in locking the rear doors from the inside is of no consequence. In other words, it does not matter whether the baby switch is opened before the locking switch 19 is actuated or after such actuation. This is because the baby switch does not affect the connection between the locking switches 19 and the rear door locking solenoids 17, but only affects unlocking solenoids 18 and the unlocking switches 20 of the rear doors.

*Front lock structure*

Before describing the lock structures in detail it may be well to point out some of the more important functions which the structures must perform. As pointed out above, the front door locks in the illustrated embodiment have means for locking the outside door handle only. Unlatching movement of the inside handle operates the unlocking solenoid, but it is desirable that this actuation occur only the first time the inside handle is moved, so that repeated openings of the door will not needlessly energize the unlocking solenoids. In the front door locks the kick-off feature present in many conventional locks is not present, so that when the door is slammed after the locking switch is acutuated the doors will remain locked.

In the rear locks of the illustrated embodiment, locking means are provided for both the inside and outside handles. Unlatching movement of the rear inside handles serve to actuate the unlocking solenoids, and for this purpose means are provided responsive to the initial movement of the inside handles to actuate the rear door unlocking switches. As in the front door lock, it is desirable to provide means for preventing repeated openings of the door from needlessly actuating the unlocking solenoids, once the doors are unlocked.

Figures 2, 3:
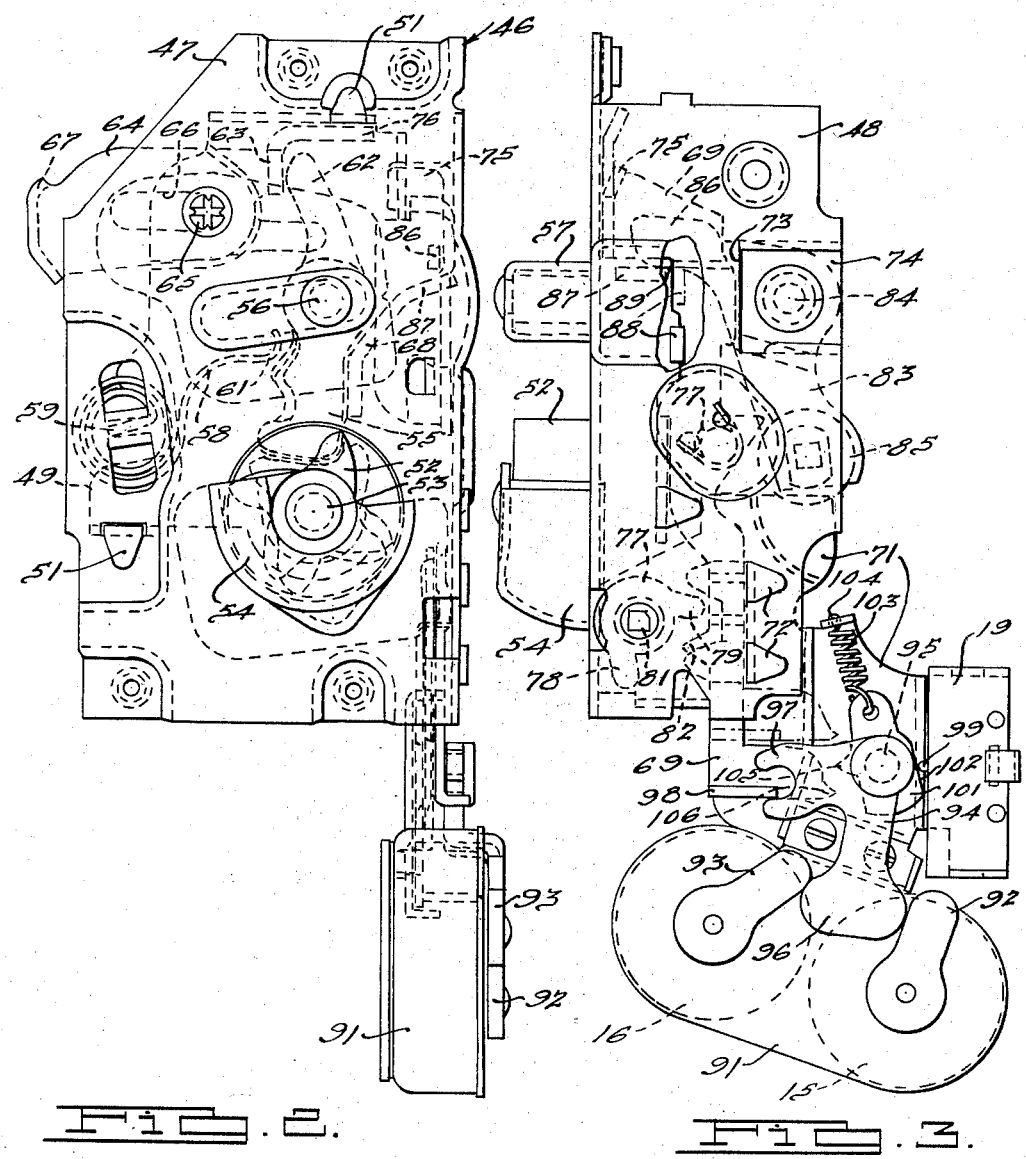
Figure 2 is a front elevational view of a preferred front door lock for use in conjunction with the system.
Figure 3 is a side elevational view thereof.

Referring now to Figures 2 and 3 illustrating a preferred embodiment of the front door lock, it will be seen that the lock is largely of conventional rotor lock construction. The parts are supported by a plate support generally indicated at 46 and comprising a base portion 47 and flange portion 48 in substantially normal relation. Secured in spaced parallel relation with the base portion 47 is a cover member 49, the cover member being secured to the plate support by tabs 51. A multi-toothed rotor latch 52 is pivotally supported on pin 53 by the outboard bearing support 54 and cover plate 49 and is provided with a plurality of dogging cams 55, these cams having slightly differing lengths to provide the take-up action in the conventional manner. Cams 55 are pivoted on a pin 56 passing through striker 57 which is spaced above the rotor 52.

A plurality of springs 58 are each secured at one end 59 to the housing and engage the individual cams at their other ends 61, urging the cams into latching position. One of the cams, called the lifting cam, has an extension 62 which is engageable by a portion 63 of a slidable outside rollback member 64. The rollback member is supported for sliding movement on a stationary pin 65 disposed within a slot 66 on the rollback, and the outer end of the rollback is provided with a flange 67 adapted to be engaged by the outside door handle (not shown) of the front door. Movement of rollback 64 to the right as shown in Figure 2 will therefore rock extension 62 and its corresponding lifting cam clockwise, this cam having a flange 68 engageable with the other cams 55 so that all will be lifted away from latching engagement with the rotor in the conventional manner. Release of the outside rollback 64 will allow springs 58 to urge cams 55 counterclockwise into latching position.

The flange portion 48 of the supporting plate supports a locking slide 69 which comprises an elongated member mounted for vertical sliding movement on the flange. In particular, the slide is guided at its lower end by its position between the flange 48 and a deck member 71, which as will be later seen also serves to support the solenoid sub-assembly. Deck member 71 is secured in spaced parallel relation with the flange 48 by spaced tabs 72 which guide also the lower edge of the slide. The upper edge is guided by the edge 73 of a portion 74 of the flange pressed inwardly from the main surface thereof. The locking slide is provided at its upper end with a flange 75 movable between a lower or unlocking position, shown in dotted lines in Figure 3, out of obstructing relation with the outside rollback, and an upper or locking position shown in dot-dash lines in which it is in obstructing relation with an extension 76 of the outside rollback, thereby preventing unlatching movement thereof. An overcenter spring 77 holds the locking slide in its locking or unlocking positions.

Means are provided for operating the locking slide either by a key from the outside of the door or by the inside handle. In particular, the key station includes a rotatable key cam 77 having radial extensions 78 and 79 and secured to key shaft 81 at the lower portion of the flange. The locking slide 69 is provided with an extension 82 which is disposed between extensions 78 and 79, so that rotation of the key cam 77 in a counterclockwise direction as seen in Figure 3 will cause upward or locking movement of the slide, whereas clockwise rotation will result in unlocking movement.

The inside rollback member 83 is pivoted at 84 to flange 48 and is provided at one end 85 with means for connecting a remote control connection (not shown) from the inside handle. The upper arm 86 of the inside rollback overlies extension 87 of lifting cam flange 68 so that counterclockwise rotation of the inside rollback will cause unlatching of the rotor. Locking slide 69 is provided with a tab 88 disposed beneath the lower edge 89 of inside rollback arm 86. The slide as shown in Figure 3 is in its unlocking position in solid lines and in locking position in dot-dash lines, and since it will be seen that in the locking position tab 88 will be just below edge 89, unlatching movement of the inside rollback will cause edge 89 to engage tab 88, moving the slide to its unlocking position. It will also be noted that no kickoff feature is present in this lock, so that if extension 87 is moved downwardly due to slamming of the door, it will not engage the locking slide or any part connected thereto in such a manner as to unlock the door.

As stated previously, the locking and unlocking solenoids and the unlocking switch are supported on deck 71, and the supporting portion of this deck extends downwardly and to the right as shown in Figure 3. The locking solenoid 15 and unlocking solenoid 16 are enclosed in a housing 91 secured to deck 71, and these solenoids have arms 92 and 93 respectively for actuating the slide. The solenoids illustrated are of any rotary type, although it will be understood the invention could be adapted for use with other types of solenoids. A bell crank 94 is pivoted at 95 to the deck and is engageable at one end 96 by solenoid arms 92 and 93, arm 92 rocking the bell crank clockwise when the locking solenoid is energized, and arm 93 rocking the bell crank counterclockwise when the unlocking solenoid is energized. The other end 97 of the bell crank is forked, and a flange 98 at the lower end of the locking slide is disposed within this forked end, the flange being shown by solid lines in its unlocking position and by dot-dash lines in its locking position.

The switch 19 is supported along one edge of deck 71, and may be a Microswitch or similar type of switch, normally open but energizable by depression of plunger 99. A switch actuating member 101 is pivoted to the deck at 95, one surface 102 of this member being adjacent plunger 99. The actuating member is held in a normal position as shown in Figure 3 in which surface 102 is immediately adjacent plunger 99, the holding means comprising a tension spring 103 anchored at one end 104 to the deck 71 and urging the actuating member into its normal position. The side of the actuating member opposite surface 102 is provided with a tapered extension 105, and the lower end of the locking slide 69 has an extension provided with a tapered toe 106. Toe 106 is shown by dotted lines in its unlocking position and by dot-dash lines in its locking position. It will be seen from an examination of Figure 3 that when locking slide 69 is moved from one to the other of its positions, toe 106 will engage extension 105. When the locking slide movement is upwards, this engagement will cause member 101 to rotate clockwise, having no effect on switch 19. However, when the locking slide movement is downwards, surface 102 of the actuating member will engage plunger 99 to close switch 19.

Operation of front door lock

In describing the operation of the front door lock, it is believed unnecessary to describe in detail the functions of the outside rollback, dogging cams and rotor latch, since these operate in the conventional manner. Assuming a condition in which the front door is locked, and it is desired to first unlock the front door from the inside, then operate the locking switch to lock all the doors, and then close the front door, the locking slide will initially be in its upper position as shown partly in dot-dash lines in Figure 3, with the bell crank 94 and solenoid arms in corresponding positions. In this position the outside rollback will of course be prevented from movement, but the inside rollback 83 can be rotated by movement of the inside handle.

Assuming that the lock is in the door adjacent the occupant who is leaving the car, this occupant will rotate inside rollback 83 counterclockwise, and surface 89 of the rollback will engage tab 88 to force locking slide 69 downwardly. During this movement bell crank 94 will rotate counterclockwise toward its position shown in Figure 3, and it should be noted that solenoid arms 92 and 93 are free to move in either direction at all times when the solenoids are de-energized, so that this idle movement of the bell crank will not be prevented. Downward movement of the slide also causes toe 106 thereof to momentarily engage tapered extension 105 of switch actuator 101, and the subsequent counterclockwise rotation of member 101 will momentarily close switch 19. Closure of this switch will, as explained previously, energize all the unlocking solenoids if the baby switch is closed, and the front door locking solenoids if the baby switch is open. Unlocking solenoid 16 shown in Figure 3 will be one of those energized, but the energization of the unlocking solenoid in this particular lock will perform no function since the locking slide is already in unlocking position.

It should be noted that if the lock under discussion is opposite the door adjacent the occupant leaving the car, the inside rollback will not be moved, and the locking slide will remain in locking position until the unlocking solenoid 16 is energized, at which time the counterclockwise rotation of bell crank 94 will cause the locking slide to move downwardly. During this downward movement, the switch 19 of the lock will be momentarily closed, but this will have no effect since the unlocking switch in the lock initially opened by the occupant will have already energized all the unlocking solenoids.

If an occupant operates the inside handle of a front door which is already unlocked, no movement of the locking slide 69 will take place, and there will be no actuation of unlocking switch 19. It will therefore be seen that there is no needless energization of the unlocking solenoids when the door locks are already in their unlocked condition.

After the occupant has stepped out of the front seat, he will actuate locking switch 21 of the open front door. This will cause locking solenoid 15 of each front door lock as well as locking solenoids 17 of the rear door locks to be energized. Locking solenoid arm 92 will swing counterclockwise as shown in Figure 3, rocking bell crank 94 clockwise and lifting locking slide 69. During this movement toe 106 on the locking slide will engage projection 105 on pivoted member 101, but since this will cause the pivoted member to rock clockwise, it will have no effect on switch 19. The front door locks will then be locked on the outside since locking flange 75 will be in obstructing relation with extension 76 on the outside rollback. The operator then closes the front door, and subsequent rotation of rotor latch 52 will cause downward movement of extension 87 on the lifting cam. However, since there is no projection on the locking slide in the path of extension 87, there will be no kick-off action and the door will remain locked.

It should be observed that if another occupant is simultaneously leaving the car from the other front door, the opening and closing of the other front door will have no effect on the sequence of actions just described, regardless of whether the other front door is closed before or after the operator's front door. However, should the first occupant of the front seat open his door, operate his locking switch, and close his door, and should a second occupant of the front seat thereafter open the other front door, this will actuate all the unlocking solenoids, and it will be necessary for the second occupant to actuate his locking switch before closing his door.

Assuming now that a person wishes to enter the locked vehicle, the car key (not shown in Figures 2 and 3) will be inserted in the door lock and key shaft 81 rotated clockwise to the position shown in dotted lines in Figure 3. Extension 79 on cam 77 will engage extension 82 on locking slide, moving the latter downwardly. This will not only unlock the particular door in which the key is inserted, but will also momentarily close unlocking switch 19 due to the engagement of toe 106 with extension 105. The unlocking solenoids of the other doors will thus be energized, and all the doors will be unlocked. It should be observed that the unlocking of the front door into which the key is inserted is entirely mechanical, so that in the event of failure of the electrical system the owner is assured of being able to enter the car. After the doors are unlocked, one or more doors may then be opened from the outside, and after the occupants enter, these doors are closed from the inside. This action will have no effect on the locking or unlocking solenoids, but after the occupants enter the closed doors may be locked by actuating one of the locking switches 21, as described previously.

Rear lock structure

The rear lock is shown in Figures 4 and 5, and again the main elements of the lock are similar to those of conventional rotor lock structures. The plate support 107 of each lock comprises a base portion 108 and flange portion 109 in angular relation, and the multi-toothed rotor 110 is supported by deck plate 111 in spaced parallel relation with the base portion, and by outboard bearing member 112. Dogging cams 113 are pivoted at 114 on a pin passing through striker 115, and one of these dogging cams (the lifting cam) has an extension 116 engageable by outside rollback 117. The latter is slidably supported by pin 118, is provided with a flanged end 119 adapted to engage by the rear outside handle (not shown), and has an extension 121 for locking purposes.

The locking member 122 is pivoted at 123 to the flange portion 109 and has a flanged locking portion 124 movable into obstructing relation with extension 121 of the outside rollback, the locking portion being shown by dot-dash lines in its locking position in Figure 5, and by dotted lines in its unlocking position. Locking member 122 has an upward apertured extension 124' which is adapted to be connected with remote locking means (not shown) such as a button on the inside garnish molding of the door. Unlike the front door, the rear door unlocking member is provided with means for locking the inside rollback 125 as well as the outside rollback, and this means comprises extension 126 on locking member 122 with spaced side flanges 127 and 128. Lower flange 128 is movable downwardly from the position shown in Figure 5 into obstructing relation with locking surface 129 on the inside rollback, which is pivoted at 130 to the flange portion 109. Locking member 122 is held in its locking or unlocking position by an overcenter spring 131, and it will therefore be seen that when in its locking position both the inside and outside handles will be locked.

Describing more particularly the function of the inside rollback 125, it will be seen that this member is provided with an arm 132 to which a link (not shown) from the remote inside handle may be attached. Counterclockwise movement of the inside rollback as shown in Figure 5 will cause unlatching arm 133 of this member to engage extension 134 on lifting cam 113, moving all of the cams in an unlatching direction against springs 135. However, when locking member 122 is in locking position as shown partly in dot-dash lines in Figure 5, locking flange 128 obstructs movement of surface 129 so that unlatching is prevented.

It will be observed that there is a definite space between the edge of flange 128 in its locking position and surface 129, so that a slight initial counterclockwise movement of inside rollback 125 is permitted. Means are provided for causing unlocking switch 20 to be actuated by this initial movement of the inside rollback. In particular, one side of the inside rollback is provided with a curved cam surface 136 which is adapted to engage a toe 137 on a switch actuating member 138 freely suspended from a bell crank 139, the function of the switch actuator being described below. The bell crank serves to transmit movement from the unlocking solenoid 18 and locking solenoid 17 to locking member 122. The unlocking and locking solenoids are again of the rotary type, having arms 141 and 142 respectively, and are secured to a deck plate 143 which is attached to and extends outwardly from flange portion 109 of supporting plate 107. Bell crank 139 is pivoted at 144 to the mounting plate, and switch 20 is secured to the mounting plate below the bell crank. Member 138 is freely pivoted at 145 in suspended relation from one arm 146 of the bell crank, the end of this arm being disposed between flanges 127 and 128, so that rocking movement of the bell crank will move the locking member 122 between its locking and unlocking positions.

The disposition of member 138 is such that toe 137 thereof is lowered into adjacent relation with cam surface 136 of the inside rollback when the locking member is in locking position, as shown in dot-dash lines in Figure 5. The lower end of member 138 carries a leaf member 147 which is adjacent a plunger 148 of switch 20. Like the front door unlocking switch, switch 20 is preferably a normally open switch such as a microswitch requiring slight movement for actuation. It will be seen that when the inside rollback is initially rotated counterclockwise, member 138 will be cammed counterclockwise, pressing leaf member 147 against plunger 148 and closing the unlocking switch 20. This will actuate the unlocking solenoid 18 in the door lock under discussion, as well as the other unlocking solenoids. Bell crank 139 will be rotated clockwise by solenoid arm 141, swinging locking member 122 counterclockwise into its solid line position in Figure 5. This will remove flange 124 from obstructing relation with the outside rollback, and will remove flange 128 from obstructing relation with the inside rollback. It should be noted that the initial spacing between flange 128 and surface 129 is sufficient to allow the camming action of member 138 to take place.

The inside rollback is now free to continue its rotation in an unlatching direction, and the door will be opened. At the same time, suspended member 138 will be lifted into its full line position in Figure 5, lifting toe 137 away from cam surface 136. Thereafter, repeated unlatching movements of the inside rollback will not affect the unlocking switch 20, since the cam surface 136 will be out of contact with toe 137. Unnecessary energization of the unlocking solenoids after the doors are unlocked is thus prevented.

*Operation of rear door lock*

The operation of the rear door locks may perhaps best be understood with relation to a passenger in the rear seat who wishes to leave the vehicle, with an occupant of the front seat relocking the doors after the rear seat passenger has departed. Assuming an initial condition in which all doors are locked, the lock elements will be as shown partly in their dot-dash positions in Figure 5. When the rear passenger wishes to leave, he merely actuates the inside handle, the initial movement of this handle being permitted by the lock spacing described above. The counterclockwise camming of member 138 by cam surface 136 will actuate unlocking switch 20, causing unlocking solenoids 18 of the rear doors as well as unlocking solenoids 16 of the front doors to be energized. At the same time, member 138 is lifted away from cam surface 136 and switch 20 is opened. Bell crank 139 will be rotated clockwise, swinging locking member 122 counterclockwise to unlock both the inside and outside handles, and inside handle movement may then be continued to unlatch the rear door. Before or after this door is closed, the front seat occupant may actuate a locking switch 21, and this will actuate locking solenoids 17 to rotate the locking member 122 clockwise into locking position. If this is done before the doors are closed, closing of the door will have no effect on its locked condition since there is no kick-off feature incorporated in the lock structure.

In the case of the rear lock which is opposite the one opened by the rear seat occupant, the action will be the same except that the inside rollback will not be moved. Unlocking will occur when the unlocking switch 20 of the opposite door is actuated, at which time unlocking solenoid 18 will be energized to unlock the door.

It should be observed that since arm 124 is adapted to be connected to a remote inside lock operator (not shown) such as a button mounted on the inside garnish molding of the door, mechanical locking and unlocking of the rear doors may still be accomplished even if there should be a power failure.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a coincidental locking system for automotive vehicles having doors, a lock structure on each door of said vehicle including a latch bolt, means for unlatching each door by an inside and an outside handle, locking means on each of said lock structures for preventing unlatching by said outside handle, an electrically operated actuator on each lock structure for moving said locking means into locking position, a second electrically operated actuator on each lock structure for moving said locking means to unlocking position, an unlocking switch operable by inside handle movement of one of said doors in an unlatching direction to simultaneously energize the unlocking actuators of all of said doors, and a locking switch operable from the inside of the vehicle for simultaneously energizing the locking actuators for all of said doors.

2. In a coincidental locking system for automotive vehicles having doors, a lock structure on each door of said vehicle including a latch bolt, means for unlatching each door by an inside and an outside handle, locking means on each of said lock structures for preventing unlatching by said outside handle, an electrically operated actuator on each lock structure for moving said locking means into locking position, a second electrically operated actuator on each lock structure for moving said locking means into unlocking position, an unlocking switch forming part of each lock and actuatable by movement of inside handle for energizing all of said unlocking actuators, a key station in at least one of said lock structures and operable from outside the vehicle, means connecting said key station and said unlocking switch for actuating said switch by operation of the key station, and a locking switch operable from within said vehicle to simultaneously energize all of said locking actuators.

3. In a coincidental locking system for automotive vehicles having doors, a lock structure on each door of said vehicle including a latch bolt, means for unlatching each door by an inside and an outside handle, locking unlatching by said outside handle, an electrically operated actuator on each lock structure for moving said locking means into locking position, a second electrically operated actuator on each lock structure for moving said locking means into unlocking position, an unlocking switch operable by inside handle movement of one of said doors in an unlatching direction to simultaneously energize the unlocking actuators of all of said doors, a locking switch operable from the inside of the vehicle for simultaneously energizing the locking actuators for all of said doors, and a safety switch in circuit with said locking switch and said locking actuators, said safety switch being operable by insertion of the vehicle ignition key in the ignition switch to open said circuit.

4. In an automotive vehicle of the type having a lock structure on each door, means for unlatching each door by an inside and an outside handle, locking means on each lock structure for preventing unlatching by the outside handle, and an ignition switch, a coincidental locking system for said vehicle including an electrically operated actuator on each lock structure for moving said locking means into locking position, a second electrically operated actuator on each lock structure for moving said locking means into unlocking position, an unlocking switch operable by inside handle movement of at least one of said doors in an unlaching direction to simultaneously energize the unlocking actuators of all of said doors, a locking switch operable from the inside of the vehicle for simultaneously energizing the locking actuators for all of said doors, and a safety switch in circuit with said locking switch and said locking actuators, said safety switch being open whenever the ignition key is in the ignition switch to open said circuit, removal of the ignition key from the ignition switch allowing closure of said safety switch to thereby permit locking said doors.

5. In an automotive vehicle of the type having a lock structure on each door, means for unlatching each door by an inside and an outside handle, locking means on each lock structure for preventing unlatching by the outside handle, and an ignition switch, a coincidental locking system for said vehicle including an electrically operated actuator on each lock structure for moving said locking means into locking position, a second electrically operated actuator on each lock structure for moving said locking means into unlocking position, an unlocking switch operable by inside handle movement of at least one of said doors in an unlatching direction to simultaneously energize the unlocking actuators of all of said doors, a locking switch operable from the inside of the vehicle for simultaneously energizing the locking actuators for all of said doors, a safety switch in circuit with said locking switch and said locking actuators, said safety switch being operable by insertion of the vehicle ignition key in the ignition switch to open said circuit, and means operable when certain doors of said vehicle are closed to enable said locking switch to energize said locking actuators when said safety switch is open.

6. In an automotive vehicle of the type having a lock structure on each door, means for unlatching each door by an inside and an outside handle, locking means on each lock structure for preventing unlatching by the outside handle, and an ignition switch, a coincidental locking system for said vehicle including an electrically operated actuator on each lock structure for moving said locking means into locking position, a second electrically operated actuator on each lock structure for moving said locking means into unlocking position, an unlocking switch operable by inside handle movement of at least one of said doors in an unlatching direction to simultaneously energize the unlocking actuators of all of said doors, a locking switch operable from the inside of the vehicle for simultaneously energizing the locking actuators for all of said doors, a safety switch in circuit with said locking switch and said locking actuators, said safety switch being operable by the ignition key and being open whenever the ignition key is in the ignition switch to open said circuit, a circuit bypassing said safety switch, and a plurality of door jamb switches in said by-pass circuit, said door jamb switches being closed when certain doors of said vehicle are closed to enable said locking switch to energize said locking actuators when said safety switch is open.

7. In an automotive vehicle of the type having front and rear doors, a lock structure on each door, means for unlatching each door by an inside and an outside handle, locking means on the front door lock structures for preventing unlatching by said outside handle, and locking means on the rear door lock structures for preventing unlatching by either handle, a coincidental locking system for said vehicle including an electrically operated actuator on each lock structure for moving said locking means into locking position, a second electrically operating actuator on each lock structure for moving said locking means into unlocking position, a locking switch operable from the inside of the vehicle for simultaneously energizing the locking actuators for all of said doors, an unlocking switch operable by inside handle movement of each of said doors in an unlatching direction to simultaneously energize the unlocking actuators of all of said doors, and a selectively operable switch movable to a position disenabling all of said unlocking switches with respect to said rear door unlocking actuators.

8. In an automotive vehicle of the type having front and rear doors, a lock structure on each door, means for unlatching each door by an inside and an outside handle, locking means on the front door lock structures for preventing unlatching by said outside handle, and locking means on the rear door lock structures for preventing unlatching by either handle, a coincidental locking system for said vehicle including an electrically operated actuator on each lock structure for moving said locking means into locking position, a second electrically operating actuator on each lock structure for moving said locking means into unlocking position, a locking switch operable from the inside of the vehicle for simultaneously energizing the locking actuators for all of said doors, an unlocking switch operable by inside handle movement of each of said doors in an unlatching direction to simultaneously energize the unlocking actuators of all of said doors, and a selectively operable switch movable to a position disenabling said rear door unlocking switches with respect to all of said unlocking actuators.

9. In an automotive vehicle of the type having front and rear doors, a lock structure on each door, means for unlatching each door by an inside and an outside handle, locking means on the front door lock structures for preventing unlatching by said outside handle, and locking means on the rear door lock structures for preventing unlatching by either handle, a coincidental locking system for said vehicle including an electrically operated actuator on each lock structure for moving said locking means into locking position, a second electrically operating actuator on each lock structure for moving said locking means into unlocking position, a locking switch operable from the inside of the vehicle for simultaneously energizing the locking actuators for all of said doors, an unlocking switch operable by inside handle movement of each of said doors in an unlatching direction to simultaneously energize the unlocking actuators of all of said doors, and selectively operable switch means movable to a position disenabling all of said unlocking switches with respect to said rear door unlocking actuator and disenabling said rear door unlocking switches with respect to all of said unlocking actuators.

10. In an automotive vehicle of the type having front and rear doors, a lock structure on each door, means for unlatching each door by an inside and an outside handle, locking means on the front door lock structures for preventing unlatching by said outside handle, locking means on the rear door lock structures for preventing unlatching by either handle, and an ignition switch, a coincidental locking system for said vehicle including an electrically operated actuator on each lock structure for moving said locking means into locking position, a second electrically operating actuator on each lock structure for moving said locking means into unlocking position, an unlocking switch operable by inside handle movement of each of said doors in an unlatching direction to simultaneously energize the unlocking actuators of all of said doors, a selectively operable switch movable to a position disconnecting said rear door unlocking switches from all of said unlocking actuators, a locking switch operable from the inside of the vehicle for simultaneously energizing the locking actuators for all of said doors, and a safety switch in circuit with said locking switch and said locking actuators, said safety switch being opened whenever the ignition key is in the ignition switch whereby energization of said locking actuators is prevented.

11. In an automotive vehicle of the type having front and rear doors, a lock structure on each door, means for unlatching each door by an inside and an outside handle, locking means on the front door lock structures for preventing unlatching by said outside handle, locking means on the rear door lock structures for preventing unlatching by either handle, and an ignition switch, a coincidental locking system for said vehicle including an electrically operated actuator on each lock structure for moving said locking means into locking position, a second electrically operating actuator on each lock structure for moving said locking means into unlocking position, an unlocking switch operable by inside handle movement of each of said doors in an unlatching direction to simultaneously energize the unlocking actuators of all of said doors, a selectively operable switch movable to a position disenabling said rear door unlocking switches with respect to all of said unlocking actuators, a locking switch operable from the inside of the vehicle for simultaneously energizing the locking actuators for all of said doors, a safety switch in circuit with said locking switch and said locking actuators, said safety switch being opened whenever the ignition key is in the ignition switch whereby energization of said locking actuators is prevented, and a by-pass circuit for said safety switch and including door jamb switches closable when certain doors of the vehicle are closed, whereby energization of said locking actuators by said locking switch is permitted when said safety switch is opened.

12. In an automotive vehicle having front and rear doors with a lock structure on each door, means for unlatching each lock structure by an inside and an outside rollback, means for locking the front and rear doors against unlatching by said outside rollbacks, an unlocking solenoid mounted as part of the lock structure of each door and adapted to move said locking means into unlocking position, an unlocking switch mounted as part of each of said lock structures, means connecting the inside rollback of each of said lock structures to its corresponding unlocking switch, movement of each inside rollback when said locking means is in locking position causing actuation of said unlocking switch, and means for energizing all of said unlocking solenoids when any of said unlocking switches are actuated.

13. In an automotive vehicle having front and rear doors with a lock structure on each door, means for unlatching each lock structure by an inside and an outside rollback, locking means on said front door lock structures to prevent unlatching by said outside rollback, locking means on said rear door lock structures to prevent unlatching by said inside or outside rollbacks, an unlocking solenoid mounted as part of the lock structure of each door and adapted to move said locking means into unlocking position, an unlocking switch mounted as part of each of said lock structures, means operated by movement of said front door locking means from its locking position to its unlocking position to actuate its corresponding unlocking switch, means allowing limited movement of said rear door inside rollbacks when said rear door locking means are in locking position, means operated by said limited movement to actuate said rear door unlocking switches, and means for energizing all of said unlocking solenoids when any of said unlocking switches are actuated.

14. In an automotive vehicle having front and rear doors with a lock structure on each door, means for unlatching each lock structure by an inside and an outside rollback, means for locking the front and rear doors against unlatching by said outside rollback, an unlocking solenoid mounted as part of the lock structure of each door and adapted to move said locking means into unlocking position, an unlocking switch mounted as part of each of said lock structures, means connecting the inside rollback of each of said lock structures to each of its corresponding unlocking switches, movement of each inside rollback when said locking means is in locking position causing actuation of said unlocking switch, means for energizing all of said unlocking solenoids when any of said unlocking switches are actuated, and means on each of said lock structures for preventing said inside rollback movement from actuating said unlocking switches when said locking means are already in unlocking position.

15. A vehicle locking structure for use in a coincidental locking system, including a latch bolt, dogging means for said bolt, an outside rollback and an inside rollback movable to remove said dogging means from latching engagement with said bolt, a locking member movable between a locking position preventing unlatching movement of said outside rollback and an unlocking position permitting such movement, means on said inside rollback for moving said locking member from locking to unlocking position, a key station for moving said locking member between its said positions, a locking solenoid energizable to move said locking member into locking position, an unlocking solenoid energizable to move said locking member into unlocking position, a switch adjacent said locking member, and means operated by movement of said locking member into unlocking position for momentarily actuating said switch.

16. The combination according to claim 15, further provided with a bell crank operatively connected between said locking member and said solenoids, the solenoids being of the rotary type and each having a rotary arm engageable with said bell crank.

17. The combination according to claim 15, said momentary switch actuating means comprising a pivoted member adapted to engage said switch when swung in one direction, and resilient means for urging said pivoted member into a position disengaged from said switch, said locking member momentarily engaging said pivoted member as it passes into unlocking position to swing said pivoted member into engagement with said switch.

18. In a locking structure for an automotive vehicle having a coincidental locking system, a rotary multi-toothed latch bolt, dogging cams for said bolt, an outside rollback movable to withdraw said dogging cams from latching engagement with said bolt, an inside rollback movable to unlatch said bolt, a locking member slidable between a locking position obstructing movement of said outside rollback and an unlocking position, means for moving said locking member into unlocking position by unlatching movement of said inside rollback, a key station connected to said locking member for moving same between its positions, a locking solenoid and an unlocking solenoid, means connecting said solenoids to said locking member for movement between its said positions, a switch mounted adjacent said locking member, a swinging member resiliently held in a position adjacent said switch, and a portion on said locking member momentarily engageable with said swinging member when the locking member moves from locking to unlocking position, to thereby momentarily move said swinging member into engagement with said switch.

19. In a locking structure for automotive vehicles, a plate support, a bolt movably supported on said plate support, dogging means for said bolt, an outside and an inside rollback movable to withdraw said dogging means from said bolt, a locking member movably mounted on said plate support, said locking member being movable between a locking position obstructing movement of said outside rollback and an unlocking position, a rotary locking solenoid and a rotary unlocking solenoid mounted on said plate support, said solenoids having rotatable arms, and a bell crank engageable by said arms and connected to said locking member, whereby energization of said unlocking solenoid moves said locking member into unlocking position and energization of said locking solenoid moves said locking member into locking position.

20. In a locking structure for an automotive vehicle, a plate support having a base portion and a flange portion, a bolt movably supported on said base portion, dogging means for said bolt, an outside and an inside rollback movable to withdraw said dogging means from said bolt, a locking member movably mounted on said flange portion, said locking member being movable between a locking position obstructing movement of said outside rollback and an unlocking position, a locking solenoid and an unlocking solenoid mounted on said plate support, said solenoids having rotatable arms, and a bell crank engageable by said arms and connected to said locking member, whereby energization of said unlocking solenoid moves said locking member into unlocking position and energization of said locking solenoid will move said locking member into locking position.

21. A locking structure for an automotive vehicle having a coincidental locking system, including a latch bolt, dogging means for said bolt, an outside rollback and an inside rollback movable to move said dogging means from latching position, a locking member movable between a locking position obstructing unlatching movement of said rollbacks and an unlocking position, said locking member and said inside rollback having mutually abutting locking surfaces when said locking member is in locking position, the relative positions of said locking surfaces allowing limited movement of said inside rollback, a switch mounted adjacent said inside rollback, and means responsive to said limited movement for actuating said switch.

22. The combination according to claim 21, further provided with disenabling means for said switch actuating means, said disenabling means being operated by movement of said locking members into unlocking position.

23. A locking structure for an automotive vehicle having a coincidental locking system, including a latch bolt, dogging means for said bolt, an outside rollback and an inside rollback movable to move said dogging means from latching position, a locking member movable between a locking position obstructing unlatching movement of said rollbacks and an unlocking position, said locking member and said inside rollback having mutually abutting locking surfaces when said locking member is in locking position, the relative positions of said locking surfaces allowing limited movement of said inside rollback, a locking solenoid and an unlocking solenoid, means connecting said solenoids to said locking member for moving the same between its said positions, a switch mounted adjacent said inside rollback, and means responsive to said limited movement for actuating said switch.

24. The combination according to claim 23, said switch actuating means being movable with said locking member, and a cam surface on said inside rollback engageable with said switch actuating means when said locking member is in locking position, movement of said locking member to unlocking position withdrawing said switch actuating means from the path of said cam surface.

25. In a locking structure for an automotive vehicle having a coincidental locking system, a plate support having a base portion and a flange portion, a rotary multi-toothed bolt mounted on said base portion, dogging means for said bolt, an outside rollback movable to withdraw said dogging means from latching engagement with said bolt, an inside rollback pivoted to said flange portion for unlatching said bolt, a locking member pivoted to said flange portion and having locking surfaces movable into obstructing relation with said rollbacks when the locking member is moved into locking position, the locking surface for said inside rollback being so positioned as to permit limited intial movement of sad rollback, locking and unlocking solenoids mounted on said supporting plate, said solenoids being of the rotary type, a bell crank rockable by said solenoids in opposite directions, said bell crank being connected to said locking member for moving the same between its said positions, a switch mounted adjacent said inside rollback, a switch actuating member movable with said bell crank, and a cam surface on said inside rollback and engageable with said switch actuating member during said limited initial movement and when said locking member is in locking position to actuate said switch, movement of said locking member into unlocking position causing wthdrawal of said switch actuating member from the path of movement of said cam surface.

26. In combination, a plurality of vehicle door lock structures having latch bolts, an inside and an outside rollback on each lock structure for unlatching said latch bolt, locking means on each of said lock structures for preventing unlatching by its outside rollback, an electrically operated actuator on each lock structure for moving said locking means into locking position, a second electrically operated actuator on each lock structure for moving said locking means to unlocking position, an unlocking switch for each lock structure operable by movement of its corresponding inside rollback in an unlatching direction, means responsive to operation of any of said unlocking switches simultaneously to energize the unlocking actuators of all of said structures, a locking switch, and means responsive to operation of said locking switch for simultaneously energizing the locking actuators for all of said lock structures.

27. The combination according to claim 26, further provided with a selectively operable switch movable to a position disenabling all of said unlocking switches with respect to certain of said unlocking actuators.

28. In combination, a plurality of vehicle door lock structures, means for unlatching each lock structure including an inside and an outside rollback, means for locking said lock structures against unlatching by said outside rollbacks, an electrically operated actuator for each lock structure adapted to move its corresponding locking means into unlocking position, an unlocking switch for each of said lock structures, means connecting the inside rollback of each of said lock structures to its corresponding unlocking switch, whereby movement of each inside rollback when its corresponding locking means is in locking position will cause actuation of said unlocking switch, and means responsive to actuation of any of said unlocking switches for energizing all of said electrically operated actuators.

29. The combination according to claim 28, further provided with means on each of said locking structures for preventing said inside rollback movement for actuating said unlocking switches when said locking means are already in unlocking position.

30. The combination according to claim 28, further provided with a second electrically operated actuator on each locking structure for moving said locking means into locking position, a locking switch, and means responsive to operation of said locking switch for simultaneously energizing the locking actuators for all of said locks.

31. In a coincidental locking system for the doors of automotive vehicles, a lock structure on each door, inside and outside handles on each door for moving the corresponding lock structure to unlatching position, a locking member on each lock structure movable between an inoperative position and a locking position rendering the corresponding outside handle ineffective for moving its lock structure to unlatching position, an electrical actuator on each door for moving said locking member to its inoperative position, a normally open locking switch accessible to an occupant of the vehicle, means responsive to closure of said locking switch for locking all doors of the vehicle simultaneously, a normally closed ignition key-controlled switch in series with said locking switch, said ignition key-controlled switch being movable to open position when the ignition key is inserted in the ignition lock whereby said locking switch will be disenabled, a by-pass circuit in parallel with said ignition key-controlled switch and in series with said locking switch, and a pair of normally open door-operated switches in said by-pass circuit, said door-operated switches being closed when two doors of said vehicle are closed, whereby said locking switch will be enabled regardless of the position of said ignition key-controlled switch.

32. In a coincidental locking system for the doors of automotive vehicles, a lock structure on each door, inside and outside handles on each door for moving the corresponding lock structure to unlatching position, a normally open locking switch accessible to an occupant of the vehicle, means responsive to momentary closure of said locking switch for simultaneously disenabling all of said outside handles, a normally closed ignition key-controlled switch in series with said locking switch, said ignition key-controlled switch being movable to open position when the ignition key is inserted in the ignition lock whereby said locking switch will be disenabled, a by-pass circuit in parallel with said ignition key-controlled switch and in series with said locking switch, and a pair of normally open door-operated switches in said by-pass circuit, said door-operated switches being closed when two doors of said vehicle are closed, whereby said locking switch will be enabled regardless of the position of said ignition key-controlled switch.

No references cited.